United States Patent [19]
Chapman et al.

[11] Patent Number: 6,099,121
[45] Date of Patent: Aug. 8, 2000

[54] CONTACT LENS DESIGN

[75] Inventors: Judith E. Chapman, Victor; Ian G. Cox, Rochester, both of N.Y.

[73] Assignee: Bausch & Lomb Incorporated, Rochester, N.Y.

[21] Appl. No.: 08/659,955

[22] Filed: Jun. 7, 1996

[51] Int. Cl.⁷ ...................................... G02C 7/04

[52] U.S. Cl. ....................................... 351/160 H

[58] Field of Search ........................ 351/160 R, 160 H, 351/161, 162

[56] References Cited

U.S. PATENT DOCUMENTS

| | | | |
|---|---|---|---|
| 4,787,732 | 11/1988 | Siviglia | 351/160 R |
| 4,861,152 | 8/1989 | Vinzia et al. | 351/160 R |
| 4,952,045 | 8/1990 | Stoyan | 351/160 R |
| 5,191,365 | 3/1993 | Stoyan | 351/160 R |

*Primary Examiner*—Scott J. Sugarman
*Attorney, Agent, or Firm*—John E. Thomas

[57] ABSTRACT

A contact lens includes an anterior surface and a posterior surface where the posterior surface includes a central zone and a peripheral zone, where the radius of curvature of the central zone is at least 0.4 mm, and preferably at least 0.6 mm, greater than the radius of curvature of the peripheral zone.

8 Claims, 1 Drawing Sheet

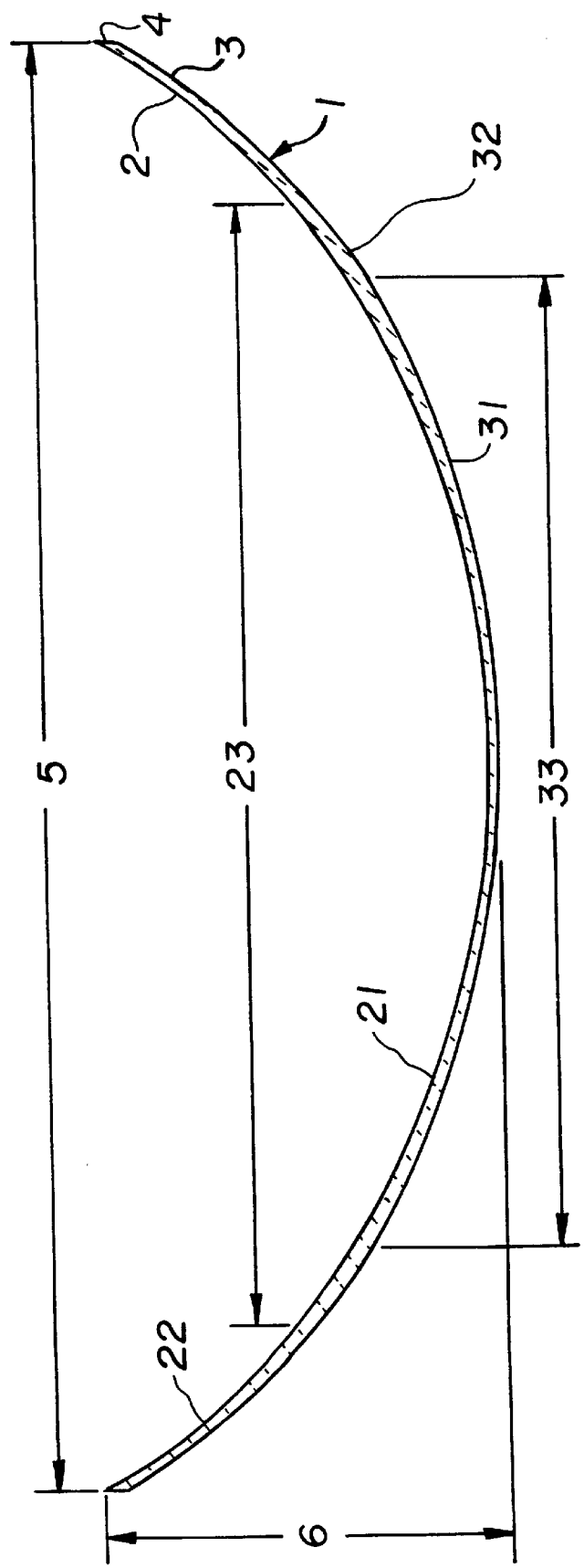

CONTACT LENS DESIGN

BACKGROUND OF THE INVENTION

A contact lens should be designed to address two primary factors, comfort to the wearer and visual acuity. A traditional approach to contact lens designs, including soft contact lenses, has focused on designing the posterior surface of the lens to approximate the corneal surface. Accordingly, the central zone of the posterior surface has a radius of curvature that approximates the curvature of the central area of the cornea. Since the cornea typically flattens at its periphery, the peripheral portion of the posterior lens surface is flatter than its central zone. In other words, the central zone has a radius of curvature that is smaller, to a predetermined degree, than the radius of curvature of the peripheral zone. This results in a contact lens where the posterior surface is steeper in the central zone and flatter in the peripheral zone.

For this approach, if the lens design does not closely match the corneal surface of a particular wearer, comfort and/or visual acuity can be compromised. In the soft contact lens industry, customized lenses, manufactured to individual needs, have become impractical, particularly in that regimens employing disposable or frequent replacement lenses have gained popularity. In order to ensure that a large population of wearers can be properly fit, a wide variety of lens designs must be produced and inventoried if the objective is to provide lenses having a posterior surface that closely matches an individual's cornea.

SUMMARY OF THE INVENTION

The present invention provides a contact lens design that fits a wider variety of wearers' corneas, including corneas that do not closely match the posterior surface of the lens design, while providing satisfactory comfort and visual acuity. The design permits minimizing the number of different designs to be inventoried as compared to designs relying on a posterior surface matching individual corneal shapes.

According to the invention, the contact lens has a posterior surface where the peripheral zone is steeper than traditional designs where the posterior surface is designed to closely match a typical cornea, and where the central zone is much flatter than such traditional designs. The contact lens is characterized by the radius of curvature of the posterior central zone being is at least 0.4 mm, and preferably at least 0.6 mm, greater than the radius of curvature of the posterior peripheral zone.

According to various preferred embodiments, the contact lens is a soft contact lens, most preferably a hydrogel contact lens. According to other preferred embodiments, the posterior central zone has a radius of curvature in the range of about 8.2 to about 9.3 mm, and the posterior peripheral zone has a radius of curvature in the range of about 6.0 to about 8.5 mm.

BRIEF DESCRIPTION OF THE DRAWING

The sole FIGURE illustrates schematically a sectional view of a contact lens of the invention.

DETAILED DESCRIPTION OF PREFERRED EMBODIMENTS

With reference to the FIGURE, contact lens 1 has a posterior (or back) surface 2 and an anterior (or front) surface 3 meeting at edge 4. Posterior surface 2 comprises central zone 21 and peripheral zone 22.

The contact lens will typically have a lens diameter 5 at the posterior surface of about 12 to about 17 mm, especially about 13 to about 15 mm. The central zone 21 will typically have a chordal diameter 23 of about 5 to about 15 mm, especially about 6 to about 12 mm. The peripheral zone 22 will typically extend about 2.0 to about 12.0 mm from the edge of the lens inwardly toward the lens center, preferably extending about 2.0 to about 8.0 mm.

For the illustrated embodiment, anterior surface 3 has a central zone 31 (the curved portion forming central zone 31 also referred to as the anterior power curve) extending across a central portion 33 of the anterior surface, and a peripheral zone 32 (the curved portion forming peripheral zone 32 also referred to as the anterior carrier curve). As is known in the art, the anterior central zone 31 and posterior central zone 21 combine to form the optical zone and provide the lens with a given refractive correction. Otherwise, the design of the anterior surface is not particularly critical, for example, the anterior surface may contain multiple peripheral curves as long as the anterior power curve covers the optical zone. Alternately, the anterior surface may be formed of a single curve.

As is known in the art, the equivalent base curve is defined by the lens diameter 5 and saggital depth 6, and can be expressed mathematically as follows:

$$R = \frac{S^2 + (D/2)^2}{2 \times S}$$

wherein

R=equivalent base curve

S=saggital depth (overall lens height–center thickness)

D=diameter.

For the present design, the equivalent base curve will typically range from about 7.5 to 9.5 mm, with the most preferred range being from about 8.0 to 9.2 mm. This range is generally consistent with traditional contact lens designs. However, according to the present invention, peripheral zone 22 is much steeper than traditional designs where the posterior surface is designed to closely match a typical cornea, and central zone 21 is much flatter than such traditional designs. For the present invention, the radius of curvature of central zone 21 is at least 0.4 mm (preferably at least 0.6 mm and most preferably in the range of about 0.6 to about 1.2 mm) greater than the radius of curvature of the peripheral zone 22. Generally, the radius of curvature of peripheral zone 22 is in the range of about 6.0 to about 8.5 mm, more preferably about 7.3 to about 8.2 mm, and the radius of curvature of central zone 21 is in the range of 8.2 to about 9.3 mm, preferably about 8.5 to about 9.0 mm.

It was found that even when the present design does not closely match an individual cornea, comfort and visual acuity is acceptable. Accordingly, a smaller range of lens designs needs to be manufactured and inventoried while still accommodating a relatively large population of wearers.

A representative design is described below to illustrate further the present invention. For this design, the posterior surface includes the embodiment shown in the FIGURE, including a posterior surface with a central zone and one peripheral zone, and an anterior surface with a central zone and one peripheral zone.

| | |
|---|---|
| Power | −3.00 diopter |
| Diameter | 14.2 mm |
| Saggital Depth | 4.0 mm |
| Equivalent Base Curve | 8.4 mm |
| Posterior Central Zone Diameter | 11.0 mm |
| Posterior Central Zone Radius of Curvature | 8.8 mm |
| Posterior Peripheral Zone Radius of Curvature | 8.2 mm |
| Anterior Central Zone Diameter | 9.5 mm |
| Anterior Central Zone Radius of Curvature | 9.45 mm |
| Anterior Peripheral Zone Radius of Curvature | 8.30 mm |

Various embodiments of the present invention are evident. As a first example, edge geometries different from those schematically illustrated in the FIGURE are within the scope of the invention. As a second example, although it is preferred that the posterior surface consists of the central zone and a single peripheral curve, as described above, the posterior surface may include multiple peripheral curves. Additionally, although the central zone and peripheral zone preferably are formed portions of a sphere (or spherical curves), one or both of these zones may be formed of a portion of a non-spherical second-order surface of revolution (i.e., a non-spherical conic functions such as an ellipse, parabola and hyperbola). Other variations and embodiments will be evident to one skilled in the art.

We claim:

1. A soft contact lens comprising a posterior surface and an anterior surface, the posterior surface consisting of a central zone and an outermost peripheral zone adjacent to the central zone, wherein the radius of curvature of the central zone is about 8.2 to about 9.3 mm and at least 0.4 mm greater than the radius of curvature of the peripheral zone.

2. The contact lens of claim 1, wherein the contact lens is a hydrogel contact lens.

3. The contact lens of claim 1, wherein the peripheral zone has a radius of curvature in the range of about 6.0 to about 8.5 mm.

4. The contact lens of claim 1, wherein the central zone has a chordal diameter in the range of about 5 to about 15 mm, and the contact lens has an overall diameter in the range of about 12 to about 17 mm.

5. The contact lens of claim 1, wherein the radius of curvature of the central zone is at least 0.6 mm greater than the radius of curvature of the peripheral zone.

6. The contact lens of claim 1, wherein the radius of curvature of the central zone is in the range of about 8.5 to about 9.0 mm, and the radius of curvature of the peripheral zone is in the range of about 7.3 to about 8.2 mm.

7. A soft contact lens comprising a posterior surface and an anterior surface, the posterior surface comprising a central zone that is flatter than a typical cornea and an outermost peripheral zone that is steeper than a typical cornea, wherein the radius of curvature of the central zone is at least 0.4 mm greater than the radius of curvature of the peripheral zone.

8. A soft contact lens comprising a posterior surface and an anterior surface, the posterior surface comprising a central zone and an outermost peripheral zone, wherein the radius of curvature of the central zone is about 8.2 to about 9.3 mm and at least 0.4 mm greater than the radius of curvature of the peripheral zone.

\* \* \* \* \*